UNITED STATES PATENT OFFICE.

EVALD ANDERSON, OF LOS ANGELES, CALIFORNIA, AND FREEMAN S. MOON, JR., OF PHILADELPHIA, PENNSYLVANIA, ASSIGNORS TO INTERNATIONAL PRECIPITATION COMPANY, OF LOS ANGELES, CALIFORNIA, A CORPORATION OF CALIFORNIA.

PROCESS FOR OBTAINING POTASSIUM CHLORID.

1,354,642. Specification of Letters Patent. Patented Oct. 5, 1920.

No Drawing. Application filed March 8, 1919. Serial No. 281,463.

*To all whom it may concern:*

Be it known that we, EVALD ANDERSON and FREEMAN S. MOON, Jr., citizens of the United States, residing, respectively, at Los Angeles, in the county of Los Angeles and State of California, and Philadelphia, in the county of Philadelphia and State of Pennsylvania, have invented a new and useful Process for Obtaining Potassium Chlorid, of which the following is a specification.

This invention relates to a process for producing potassium chlorid and is particularly applicable to the production of potassium chlorid from cement kiln dust, or other flue dust from furnaces, such as blast furnaces, or the like.

In cases of this kind, the potassium compound often occurs in the form of a mixture of potassium salts, for example, potassium sulfate and potassium chlorid. This process has been developed with special reference to the treatment of dust collected by electrical precipitation, or otherwise, from cement kilns using a raw mix containing a small percentage of potassium and also containing a small percentage of sodium chlorid, with the result that the potassium compound existing in the flue dust is partly in the form of chlorid and partly in the form of sulfate. The material obtained by leaching such dust and evaporating the resulting solution, being a mixture of potassium salts and other salts, is of comparatively low value and the main object of our invention is to provide for so carrying out the leaching operation that the potassium present will be substantially recovered in the form of approximately pure potassium chlorid having a relatively high value.

In the case of cement kiln dust of this character wherein coal is used as a fuel for firing the kiln, it has been sometimes found that there is a slight percentage of sulfids in the dust, and a further object of the invention in such cases is to so carry out the leaching operation that the presence of such sulfids will not interfere with a substantially complete recovery of the potassium as potassium chlorid.

We will describe the process as applied to a cement kiln dust obtained by electrical precipitation of the dust contained in the flue gases passing from a coal fired cement kiln wherein a small percentage of sodium chlorid is used in connection with the raw mix as a volatilizing agent for potassium compound present in the raw mix, such flue dust containing chlorids and sulfates in approximately equal amounts.

The process may be carried out as follows:

Four (4) tons of dust and two hundred and forty (240) pounds of crude calcium chlorid is mixed with about twenty-four hundred pounds of water and maintained at a suitable temperature for a sufficient time for completion of the reaction. To expedite the reaction the mixture may be digested with steam say for about an hour. The mixture is then passed through a filter and the filtrate taken to the evaporators. Here it is concentrated to about 28° Bé. and then drawn off through a filter to crystallizing tanks, while the calcium salts and a portion of the sodium salts together with some potassium salts remain in the evaporator or are removed during the evaporation.

The concentrated solution is allowed to cool in the crystallizers and after about twenty-four hours the residual liquor is drawn off to a sump or storage tank from which it is returned to the evaporators.

The salt crystallized out in the crystallizing tanks and consisting substantially or mainly of potassium chlorid is allowed to drain and then packed into barrels for shipment.

An important point in connection with the production of pure potassium chlorid is the calcium concentration in the crystallization liquid. We have found that the presence of calcium chlorid in the solution, resulting from the use of a slight excess of same, in order to insure conversion of all the potassium to the form of chlorid, affects the solubility of sodium chlorid in such manner as to reverse the temperature coefficient of solubility thereof. Sodium chlorid is slightly more soluble in cold saturated solution of KCl than in the hot solution. With about 3.73% of $CaCl_2$ present in the solution the solubility of sodium chlorid is substantially the same in hot solution as in cold and with a greater percentage of $CaCl_2$ in the solution the sodium chlorid is more soluble in hot solution than in cold. We have found in practice that it is desirable for this reason to keep the calcium chlorid concentration in the solution below a certain limit preferably not to much exceed 6 grams of CaCl$_2$ per 100 cc. of solution.

If absolutely pure potassium chlorid is required, it is essential to work with a CaCl$_2$ concentration of less than 3.7%, but for commercial purposes the limit stated gives satisfactory results, inasmuch as the operations are carried out with sufficient rapidity to prevent precipitation of any considerable amount of sodium chlorid along with the potassium chlorid, even though the sodium salt would separate if sufficient time were allowed.

In order to insure the conversion of all of the potassium sulfate to potassium chlorid, it is necessary, as above stated, to maintain a certain calcium chlorid concentration in the solution and this can be accomplished by analyzing the dust to be leached and adding calcium chlorid in theoretical proportions for the required conversion and passing the solution from the filter direct to the sump instead of to the evaporator, the solution being then taken from the sump to the evaporator and then filtered, and the filtrate run to a crystallizer, as above described, the residual liquor from the crystallizer also passing through the sump. With this procedure calcium chlorid tends to accumulate in the sump, as the residual liquor from the crystallizer always contains calcium chlorid. By so doing, only the theoretical amount of calcium chlorid need be added at the digester since the excess calcium salt in the sump will provide the necessary factor of safety to prevent the crystallization of potassium sulfate. In this connection, provision should also be made for any sodium sulfate present in the dust, allowing sufficient calcium chlorid for conversion thereof, as well as the potassium sulfate, to form a chlorid so as to insure all of the potassium sulfate being converted to chlorid.

In order to assist in the settling of the calcium sulfate that may form in the sump, it is preferable to provide for heating the solution in the sump, for example, with steam. This sulfate can then be removed from time to time and added directly to the digester mixture so as to take out any admixed potassium salt and the residual calcium sulfate may be caught.

In carrying out the process as above certain precautions must be taken in order to insure the production of an approximately pure potassium chlorid. We have found, for example, that it is important to allow sufficient time after evaporation is completed and before the solution is run to the crystallizing tanks to permit of substantially complete separation and settlement of sodium chlorid in excess of the amount required for concentration. This is due to the fact that at the moment of completion of the evaporating operation the solution is, in general, supersaturated with sodium chlorid so that if it were run immediately to the crystallizing tanks more or less sodium chlorid would be precipitated along with the potassium chlorid as the solution cools. It is therefore desirable to allow the solution to remain in the evaporators for from fifteen to thirty minutes after the fire is drawn before being passed to the crystallizing tanks so as to allow the supersaturated solution to reach equilibrium and excess sodium chlorid to settle out in the evaporators. The sodium chlorid settling out in the evaporators should be removed either before or immediately after drawing the fire; this will be practically only a mixture of calcium sulfate and sodium chlorid and may therefore be returned to the kilns. Any potassium salt it may contain can be washed out in a filter by using a concentrated solution of sodium chlorid as wash water. The salt which settles out in the evaporators when the solution cools after the fire has been drawn may contain appreciable amounts of potassium chlorid and this salt is preferably returned to the evaporators when the next batch of solution is added.

In case the potassium is present in the dust in the form of sulfid or sulfite to any considerable extent, it is desirable, in some cases, to add sufficient bleaching powder (calcium hypochlorite) to oxidize the sulfid to sulfate, the latter being then converted to chlorid, as above described. The addition of the required amount of bleaching powder may be made along with the calcium chlorid in the digesting or leaching operation. In general, however, the amount of alkali metal sulfid present is so small that it is effectively converted to sulfate by the oxidizing action of the air in the regular operation of the process without the necessity of adding any oxidizing agent, such as bleaching powder.

In some cases the furnace dust may be leached or digested with hot water and the resulting solution then treated with sufficient calcium chlorid (together with calcium hypochlorite, if necessary) to convert all the potassium present to the form of chlorid. The above precaution as to avoiding excess of calcium chlorid being observed as above described.

An important advantage of converting the potassium present in or obtained from the cement dust to the form of chlorid is that this permits the solution to be extracted at greater concentration than would be possible with the sulfate on account of the greater solubility of the chlorid. By reason of the greater concentration obtainable with chlorid less evaporation is required for the recovery of the solid salt from the solution and considerable saving of fuel is effected. Moreover, the chlorid of potassium is free from the disadvantageous tendency of the sulfate to separate out together with calcium sulfate at certain stages of the process, forming scales on the surface of the leaching receptacles. These advantages are of especial importance when the leaching is carried out by passing the leaching solution over extended surfaces in contact with hot kiln gases containing the dust to be treated, such dust being taken up by the solution.

Our invention may be carried out by leaching the cement kiln dust collected in any suitable manner, or it may be carried out by utilizing the leaching solution for collection of the dust to be treated from hot gases from cement kilns, such gases being passed in contact with streams of the liquid flowing over surfaces or walls, and a convenient application of the invention is in connection with an electrical precipitator of the wet type, such as is disclosed in Patent No. 1,250,088 to H. A. Burns, dated December 11th, 1917, or other type in which the collecting electrodes of the precipitator are provided with means for maintaining flow of liquid thereover. In such cases the liquid used for circulation over the collecting surfaces is preferably residual liquor remaining after the potassium chlorid has been removed from the solution resulting from leaching and evaporation.

What we claim is:

1. The process of obtaining potassium chlorid from furnace dust containing potassium sulfate and potassium chlorid, which consists in leaching the dust with a solution containing sufficient calcium chlorid to convert the alkali-metal sulfates present to the form of chlorid, removing the solution from the solids, and recovering the potassium chlorid from the solution.

2. The process of obtaining potassium chlorid from furnace dust containing potassium chlorid and potassium sulfate, and also containing sodium salts, which consists in leaching such dust with a solution containing calcium chlorid in excess of the amount required for conversion of all of the alkali metal sulfates present to chlorids, separating the solution from the solids and concentrating to approximately the saturation point for potassium chlorid in the hot solution removing solids from the solution and cooling the solution sufficiently to precipitate potassium chlorid, the excess of calcium chlorid in the solution being maintained sufficiently low to prevent precipitation of sodium chlorid in cooling.

3. A process, according to claim 2, wherein the solution is allowed to stand after evaporation and before cooling for crystallization of potassium chlorid in such manner as to insure precipitation and settlement of sodium chlorid from supersaturated solution before the potassium chlorid is crystallized.

4. The process of obtaining potassium chlorid from furnace dust containing potassium sulfate and alkali metal sulfids and chlorids, which consists in leaching the dust with a solution containing calcium chlorid and oxidizing agent so as to oxidize the potassium sulfid or sulfite present and convert all of the potassium present to the form of chlorid.

5. The process of obtaining potassium chlorid from furnace dust containing potassium sulfate and alkali metal sulfids and chlorids, which consists in leaching the dust with a solution containing sufficient hypochlorite compound to convert the potassium sulfid present to the form of potassium sulfate, said solution also containing sufficient calcium chlorid to convert substantially all of the potassium present to the form of potassium chlorid.

6. In the treatment of furnace dust containing chlorid and sulfate of potassium and chlorid of sodium, by leaching the dust, concentrating the resulting solution to saturation with potassium chlorid when hot, and then cooling the solution for the purpose of obtaining potassium chlorid, the method of converting potassium sulfate present to potassium chlorid, which consists in providing in the solution calcium chlorid slightly in excess of the amount required to convert substantially all of the potassium compound present to the form of potassium chlorid and maintaining such excess of calcium chlorid below the amount which would cause such reversal of the temperature co-efficient of solubility of sodium chlorid in saturated chlorid solution, as would result in considerable precipitation of sodium chlorid with the potassium chlorid.

EVALD ANDERSON.
FREEMAN S. MOON, Jr.